(12) United States Patent
Meyer (10) Patent No.: US 11,623,878 B2
(45) Date of Patent: Apr. 11, 2023

(54) LAKE RAKE

(71) Applicant: Jack Meyer, Grand Junction, MI (US)

(72) Inventor: Jack Meyer, Grand Junction, MI (US)

( * ) Notice: Subject to any disclaimer, the term of this patent is extended or adjusted under 35 U.S.C. 154(b) by 0 days.

(21) Appl. No.: 17/460,508

(22) Filed: Aug. 30, 2021

(65) Prior Publication Data

US 2022/0073378 A1 Mar. 10, 2022

Related U.S. Application Data

(60) Provisional application No. 63/076,094, filed on Sep. 9, 2020.

(51) Int. Cl.

| | |
|---|---|
| *E04H 4/16* | (2006.01) |
| *A01D 7/00* | (2006.01) |
| *C02F 1/40* | (2023.01) |
| *C02F 1/00* | (2023.01) |
| *A01D 7/10* | (2006.01) |
| *A01D 44/00* | (2006.01) |
| *E02B 15/00* | (2006.01) |
| *C02F 103/42* | (2006.01) |
| *C02F 103/00* | (2006.01) |

(52) U.S. Cl.
CPC ................ *C02F 1/40* (2013.01); *A01D 7/10* (2013.01); *A01D 44/00* (2013.01); *C02F 1/001* (2013.01); *E02B 15/00* (2013.01); *E04H 4/1609* (2013.01); *C02F 2103/007* (2013.01); *C02F 2103/42* (2013.01); *C02F 2201/004* (2013.01)

(58) Field of Classification Search
CPC ......... E04H 4/1609; E02B 15/10; A01B 1/20; A01D 7/00; A01D 7/02; A01D 7/10; A01D 44/00

USPC ...... 210/167.1, 167.19, 170.02, 170.09, 470, 210/747.5; 4/490, 496; 56/8, 400.01, 56/400.04, 400.11

See application file for complete search history.

(56) References Cited

U.S. PATENT DOCUMENTS

| | | | | |
|---|---|---|---|---|
| 3,863,237 A | * | 1/1975 | Doerr | E04H 4/1609 210/170.09 |
| 4,152,801 A | * | 5/1979 | Lieber | E04H 4/1609 210/470 |
| 4,189,908 A | * | 2/1980 | Brock, Jr. | A01D 7/06 56/400.01 |
| 4,190,279 A | * | 2/1980 | Sguazzin | A01K 80/00 37/316 |
| 4,828,690 A | * | 5/1989 | Montez | E01H 12/00 56/400.11 |

(Continued)

*Primary Examiner* — Christopher Upton
(74) *Attorney, Agent, or Firm* — Brennan, Manna & Diamond, LLC (57) ABSTRACT

The present invention relates to a multipurpose tool that is configured to collect seaweed and other debris from the edges of a body of water and from shorelines. The tool has an elongated handle having an ergonomic grip, a head portion, a plurality of tines extending from the head portion, and a removably attached net-like filter. Each tine has an elongated length with a downwardly extending distal portion and is supported by a curved brace, wherein the curved brace extends laterally across the tines for providing mechanical support to the tines. The tines are oriented in a tapered manner having less spacing between the tines near the head portion and more spacing between the tines at the distal end which allows the width of the tines to be larger at the distal end than near the head portion.

19 Claims, 5 Drawing Sheets

(56) References Cited

U.S. PATENT DOCUMENTS

| | | | | |
|---|---|---|---|---|
| 5,417,044 A | * | 5/1995 | Russo | A01D 7/10 |
| | | | | 56/400.11 |
| 7,350,348 B1 | * | 4/2008 | Wong | A01D 7/06 |
| | | | | 56/400.21 |
| 8,689,533 B2 | * | 4/2014 | Abughazaleh | A01D 7/00 |
| | | | | 56/400.11 |
| 9,573,086 B2 | * | 2/2017 | Corder | B01D 35/02 |
| 11,304,365 B2 | * | 4/2022 | Orvis | A01D 44/00 |
| 2010/0012563 A1 | * | 1/2010 | Coffman | A01D 44/00 |
| | | | | 210/170.09 |
| 2010/0263347 A1 | * | 10/2010 | Baker | A01D 44/00 |
| | | | | 56/400.11 |
| 2020/0128793 A1 | * | 4/2020 | Fredrickson | A01B 1/20 |

\* cited by examiner

LAKE RAKE

CROSS-REFERENCE TO RELATED APPLICATION

The present application claims priority to, and the benefit of, U.S. Provisional Application No. 63/076,094, which was filed on Sep. 9, 2020 and is incorporated herein by reference in its entirety.

FIELD OF THE INVENTION

The present invention relates generally to the field of rakes. More specifically, the present invention relates to a modified rake featuring an integrated screen-like net that can be used to collect seaweed and other debris from the edges and shallows of a body of water. The modified rake can be conveniently used for properly cleaning lakes, pools, and other bodies of water. The rake device of the present invention is light-weight which enables users to easily collect debris in the net, lift it out of the water and dump the collected debris on land. The modified rake ensures that the collected debris is properly handled and provides a convenient means to clean up shorelines, beach areas and pools. Accordingly, this disclosure makes specific reference thereto the present invention. Nonetheless, it is to be appreciated that aspects of the present invention are also equally applicable to other like applications, devices and methods of manufacture.

BACKGROUND OF THE INVENTION

By way of background, ponds, lakes, and other bodies of water become overgrown with weeds and other natural vegetation. This vegetation must be removed in order for the body of water to be useable for various purposes. With the fast growth of plant life in lakes and ponds, there is a need to frequently remove the aquatic plants such as algae, seaweed, etc., from these bodies of water to make these bodies of water fit for any desired use.

Generally, a variety of tools are known in the art that allow users to remove aquatic plant growth and any debris floating in the water such as leaves, fish food, garbage, etc., from ponds, lakes and other bodies of water. Tools such as leaf and/or pool skimmers, rakes, etc., are often used by people to clean such bodies of water. Typical leaf and/or pool skimmers comprise a net or a filter-like mesh attached to a handle that allows users to skim the surface of the water and capture floating debris such as leaves, flower petals, twigs, garbage, etc. However, conventional pool skimmers fail to properly collect large debris such as seaweed and other similar objects, and thereby fail to remove aquatic plant growth from ponds, lakes, and other bodies of water. Other conventional tools such as rakes are also used by people for cleaning ponds, lakes, etc. The standard rake is an implement consisting of a pole with a toothed crossbar or fine tines at one end. The pole is held by a user and the fine tines at the other end are used for gathering debris such as seaweed, algae, etc. However, standard rakes may be unable to handle large debris like seaweed and other similar objects from the edges and shallows of lakes, ponds, etc. Also, people may lack the means to clean up lake shorelines and beach areas in general.

Therefore, there exists a long-felt need in the art for a cleaning tool that enables users to easily clean bodies of water such as ponds, lakes or the like. There is also a long-felt need in the art for a cleaning tool that enables users to remove overgrown aquatic plants such as seaweed, algae, etc. from bodies of water, in order to ensure the water is clean for various purposes. Moreover, there is a long-felt need in the art for a cleaning tool that allows users to collect and/or gather large debris such as seaweed and other similar objects from ponds, lakes and other bodies of water. Furthermore, there is a long-felt need in the art for a water-cleaning tool that ensures that lake shorelines and beach areas are properly cleaned. Finally, there is a long-felt need in the art for a water cleaning tool that is simple, lightweight, convenient and effective for cleaning up shorelines and that allows users to easily dump the collected debris.

The subject matter disclosed and claimed herein, in one embodiment thereof, comprises a water-cleaning tool that is configured to collect seaweed, algae, and other debris from the edges of a body of water and allows users to easily lift and dump the collected debris. The tool comprises an elongated handle having an ergonomic grip at a top end, a head portion detachably-connected to a bottom end of the elongated handle, and a plurality of tines extending from the head portion wherein the plurality of tines extends in a direction perpendicular to that of the handle. Additionally, a net-like filter device is detachably secured to the tool and is configured to work as a pool skimmer to help a user collect seaweed, algae and other debris to ensure that shorelines remain clean.

In this manner, the novel water-cleaning tool of the present invention accomplishes all of the forgoing objectives, and provides a relatively easy, convenient and efficient solution to collecting and disposing of debris such as seaweed, algae, etc. from ponds, lakes and other bodies of water. The tool of the present invention is also user-friendly and lightweight, and thus allows a user to easily lift and collect debris as well as dump the collected debris. Additionally, the lake tool ensures that shorelines are properly cleaned.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a water-cleaning tool. The tool is configured to collect seaweed, algae and other debris from the edges and shallows of a body of water. The tool further comprises an elongated handle having an ergonomic grip at a top end, a head portion detachably-connected to a bottom end of the elongated handle, and a plurality of tines extending from the head portion wherein the plurality of tines extend in a direction perpendicular to the elongated handle. Further, each tine has an elongated length and is supported by a curved brace. Specifically, each tine has a longitudinal length portion, a second longitudinal tine length portion and a downwardly extending distal portion. The curved brace then extends laterally across the plurality of tines for providing mechanical support to the tines. The plurality of tines are also oriented in a tapered manner having less spacing near the head portion and more spacing between the tines at the distal end which allows the width of the tines at the distal end to be larger than the width of a conventional rake device's tines. Further, a net-like filter device comprising a screen is detachably-secured to the curved brace positioned outside the lateral most tines, and is configured to work as a pool skimmer. The net-like filter device and screen is positioned halfway up the distal portion of the tines of the tool during use.

In a further embodiment of the present invention, a water-cleaning tool with an integrated filter sheet is disclosed. The tool includes a handle, a head portion, a plurality of tines attached to the head portion and a brace disposed across the tines for providing mechanical strength to the tines. Further, each tine passes through a through a hole or aperture in the brace, or the tines are attached to or secured to the surfaces of the brace. The tool also comprises a net filter attached to the brace typically through mechanical fasteners or other suitable fasteners as are known in the art. The mechanical fasteners are fastened to openings on the brace positioned on an outside surface of the lateral most tines of the tool. The net filter is a cuboidal-shaped mesh sheet having an opposing pair of connecting arms for fastening the net filter to the brace. The net filter is used for scooping debris from the edges and shallows of bodies of water.

In yet a further embodiment of the present invention, an improved water cleaning tool is disclosed. The tool has a detachably secured screen-like net filter that is fastened at the ends of a curved brace which extends laterally across a plurality of tines. The screen-like net filter is further positioned on the inside of the rake and acts similar to a pool skimmer, with the screen going half way up the distal end of the tines.

In another embodiment of the present invention, the tines may have less space (i.e., the tines are narrower in lateral spacing) between individual tines near the head portion and more space (i.e., the tines are wider in lateral spacing) at the distal end of the tines. The tines can also be pliable and can be made of a durable and sturdy material, such as aluminum, metal, plastic, etc. The filter may also have a mesh-like structure to catch debris and weeds. Further, the handle of the tool can be detached which makes the tool easy to carry.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a cleaning tool that enables users to easily clean bodies of water such as ponds, lakes, pools, etc. by removing overgrown aquatic plants such as seaweed, algae or the like. Additionally, there is a long-felt need in the art for a cleaning tool that allows users to clean bodies of water in order to ensure that the bodies of water can be used for various desired purposes by collecting and/or gathering large debris such as seaweed, algae, trash and other similar objects. Further, there is a long-felt need in the art for a water-cleaning tool that allows users to easily dispose of the gathered debris from ponds, lakes and other bodies of water to ensure that lake shorelines and beach areas are properly cleaned. Finally, there is a long-felt need in the art for a modified water-cleaning tool that is simple, light-weight, convenient and effective for cleaning up shorelines, and that allows users to easily dump the collected debris.

The present invention, in one embodiment, is comprised of a water-cleaning tool. The tool has a detachably-secured screen-like net filter that is fastened to the opposing ends of a curved brace. The curved brace extends laterally across a plurality of tines such that the screen-like net filter is positioned on the inside of the rake device similar to a pool skimmer, with the screen-like net filter positioned halfway up the distal portion of the tines of the tool during use. The complete structure of the tool allows easy removal of large debris such as seaweed from pools, lakes and other bodies of water, thus enabling users to clean up shorelines and beach areas.

Figure 1:
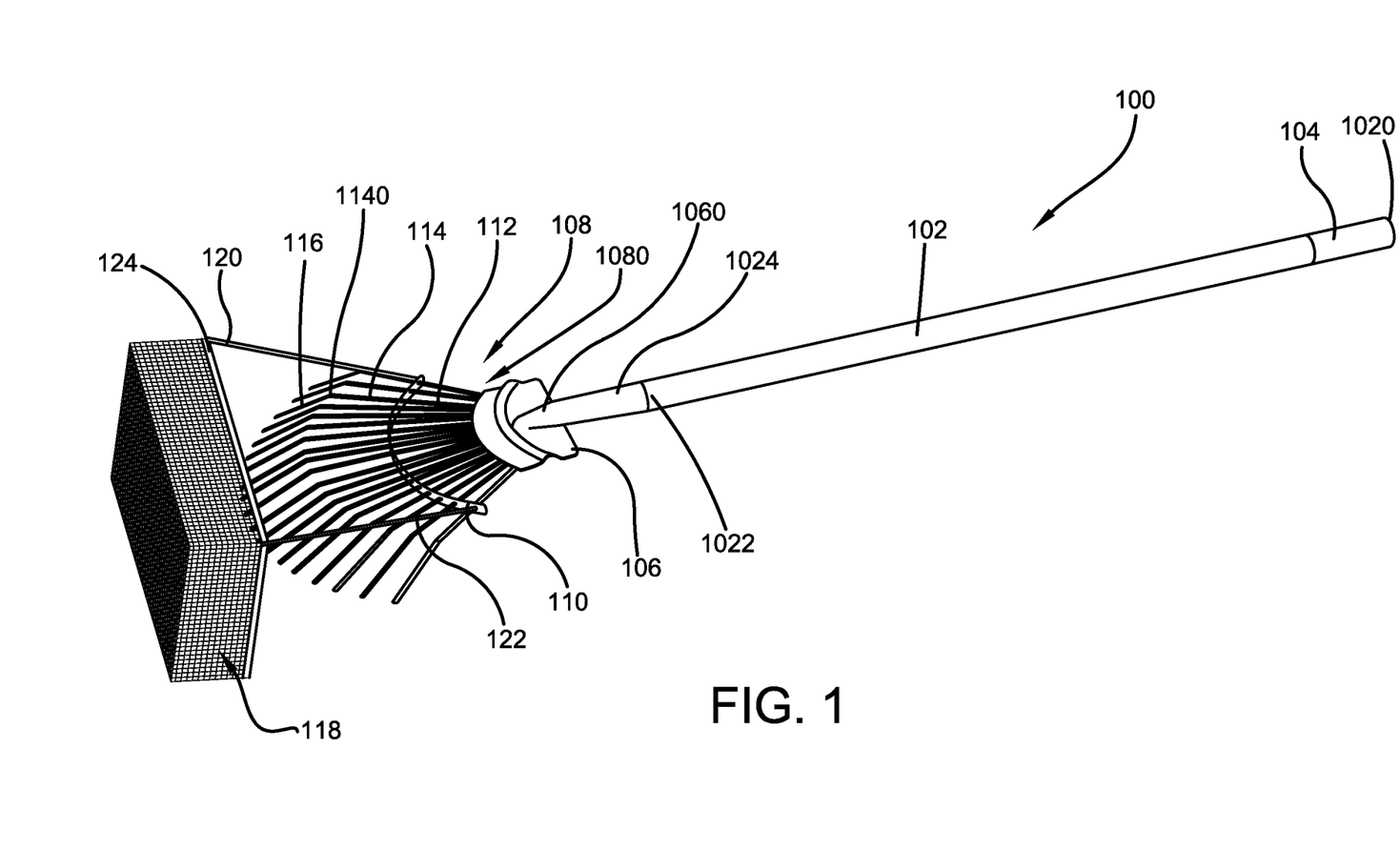
FIG. 1 illustrates a perspective view of one potential embodiment of a water-cleaning tool of the present invention in accordance with the disclosed architecture.

Referring initially to the drawings, FIG. 1 illustrates a perspective view of one potential embodiment of a water-cleaning tool 100 of the present invention in accordance with the disclosed architecture. The tool 100 of the present invention is configured to be used as a pool or lake skimmer in addition to being used as a "lake rake" for removing leaves and debris along the edges of a pool or a lake. The tool 100 comprises an elongated handle 102 that is cylindrical in shape and sized, shaped and positioned to be grasped by a human hand. The elongated handle 102 comprises a grip portion 104 positioned at a top end 1020 and a connector portion 1024 secured to the bottom end 1022. The grip portion 104 is preferably an ergonomically-shaped grip that comprises a pattern and/or grooves or other shapes and/or markings, or can be sized and shaped to be any suitable grip as is known in the art. Further, the grip 104 can be made from a resilient and/or a slip-resistant material such as, but not limited to, rubber, foam rubber, textured paint, and/or an elastomer or any other suitable material as is known in the art.

The connector portion 1024 is preferably manufactured of stainless steel but can be manufactured of any suitable material as is known in the art. The connector portion 1024 is connected to a head portion 106 via a connecting mechanism such as a mechanical fastener 1060 or any other suitable fastener as is known in the art. The mechanical fastener 1060 allows the elongated handle 102 to be removably-secured to the head portion 106, such that a user can remove the head portion 106 for easy storage of the tool 100. The elongated handle 102 can be manufactured from a material such as, but not limited to, steel or aluminum tubing, fiberglass tubing, plastic and/or wood, or any other suitable material as is known in the art.

A plurality of tines 108 extend perpendicular from the head portion 106, wherein each tine is substantially similar in shape and contour. For example, a tine 1080 extends from the head portion 106 and comprises a longitudinal tine length 112 (described for a single tine 1080 for simplicity) that extends until it contacts a curved brace 110. A second longitudinal tine length 114 then extends from the curved brace 110 until it contacts the neck 1140 of a tine 1080. A distal tine portion 116 then downwardly extends from the neck 1140 until it ends at a sharp, pointed tip 1026. Generally, the plurality of tines 108 are elongate, non-parallel and laterally-spaced apart. Further, the tool 100 can comprise any suitable quantity of tines 1080 as per the needs and/or wants of a user. The illustrated tines 108 are supported by a laterally-extending curved and fixed brace 110. The curved brace 110 supports the plurality of tines 108 and a portion of the curved brace 110 extends beyond the two opposing lateral most tines 220, 222 as shown in FIG. 2.

The plurality of tines 108 used with the tool 100 can be manufactured of metal, steel or durable plastic, or any other suitable material as is known in the art. The plurality of tines 108 are also preferably molded of a single piece of material threaded through the curved brace 110 but alternatively, longitudinal length portions 112, 114, and 116 can be separate pieces of material secured together. Further, the uniform spacing between the plurality of tines 108 does not allow leaves or other debris to be caught in the tines 108 but allows the debris to be gathered by the filter screen 118.

Additionally, at opposing ends of the curved brace 110 a filter screen 118 is removably-secured via a pair of connecting arms 120, 122. The connecting arms 120, 122 are permanently fixed to a top edge 124 of the filter screen 118 and are removably-fastened to the opposing ends of the curved brace 110, using mechanical fasteners such as pins, screws, or nuts, or any other suitable fasteners as is known in the art. The filter screen 118 is positioned below the distal tine portions 116 of the plurality of tines 108 allowing the filter screen 118 to collect seaweed, algae and other debris from the edges of a body of water like that of a pool skimmer.

Figure 2:
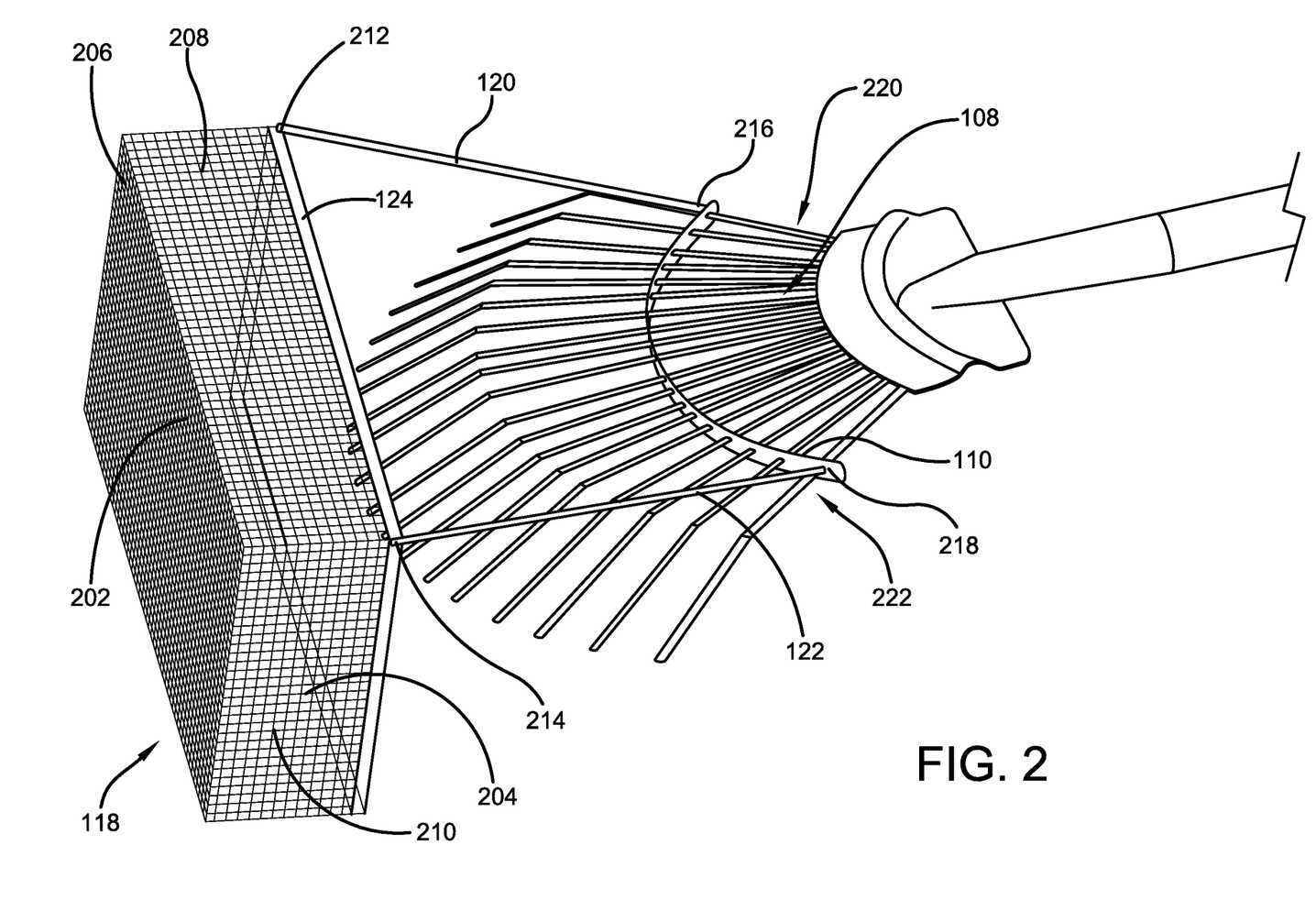
FIG. 2 illustrates a close-up view of the tines section and filter screen attachment of one potential embodiment of a water-cleaning tool of the present invention in accordance with the disclosed architecture.

FIG. 2 illustrates a close-up view of the tines 108 section and filter screen attachment 118 of one potential embodiment of a water-cleaning tool 100 of the present invention in accordance with the disclosed architecture. The filter screen attachment 118 is removably-secured to the curved brace 110 using a pair of connecting arms 120, 122. A first connecting arm 120 is permanently fixed to a first corner 212 of an edge 124 of the filter screen attachment 118, and is removably-fastened to a first connection point 216 on the curved brace 110. Similarly, a second connecting arm 122 is permanently fixed to a second corner 214 of the edge 124 of the filter screen attachment 118 and is removably-fastened to a second connection point 218 on the curved brace 110. As stated earlier, the curved brace 110 provides support to the plurality of tines 108 of the tool 100, and extends laterally such that all tines 108 pass through the brace 110. The first connection point 216 is positioned outside a first lateral most tine 220 and the second connection point 218 is positioned outside a second lateral most tine 222.

The connection points 216, 218 use mechanical fasteners such as pins or screws to removably attach the filter screen attachment 118 to the curved brace 110, and to allow the filter screen attachment 118 to pivot up and down when attached. This in turn allows the filter screen attachment 118 to more easily travel across uneven ground when in use. The filter screen attachment 118 is preferably a generally cuboidal-shaped mesh screen and is configured to act as a pool skimmer to remove debris from the edges of a pool, lake or any other body of water. The filter screen attachment 118 has a rectangular base 202 and two opposing lateral walls 204, 206 and two opposing longitudinal walls 208, 210 which extend vertically from the base 202 to create a basket-like structure for retaining debris. When a user is raking with the tool 100, the base 202 and the walls 204, 206, 208, 210 of the filter screen attachment 118 store and collect the debris, which allows a user to clean up shorelines and other similar areas. The filter screen attachment 118 is positioned on the inside of the tool 100, similar to a pool skimmer, with the filter screen attachment 118 positioned halfway up the distal portion of the tines 108 of the tool 100 during use.

Figure 5:
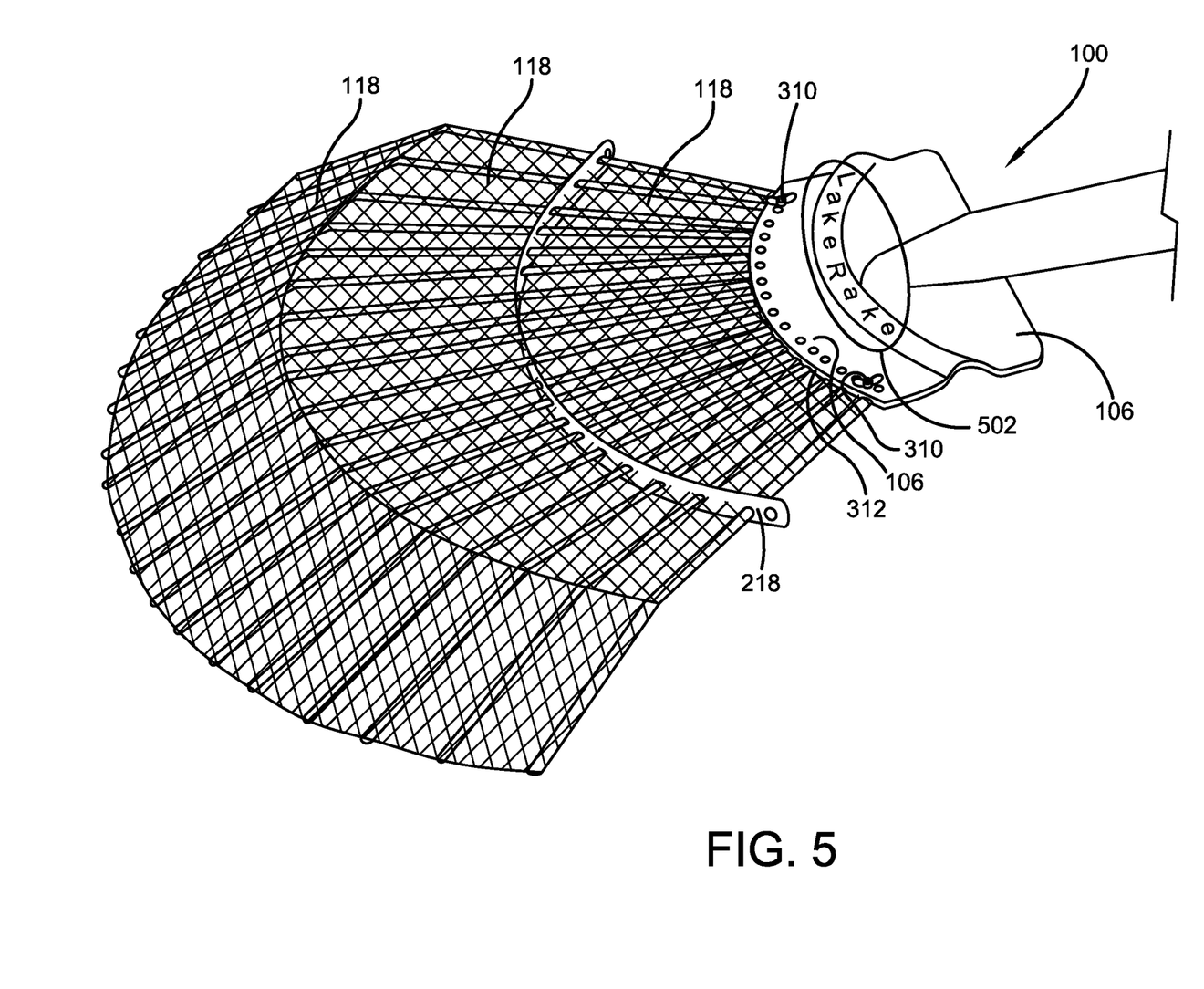
FIG. 5 illustrates a top perspective view showing a name plate on the head portion of one potential embodiment of a water-cleaning tool of the present invention in accordance with the disclosed architecture.

The filter screen 118 may also be removably attached to the plurality of tines 108 such that they screen 118 sits above, below, or inside (e.g. between each) tine 108 as shown in FIG. 5. Further, the screen 118 may be removably attached to the second connection point 218 and/or head portion 108 via a plurality of swivel locking tabs 310 or any other fastener known in the art. Further, the screen 118 may be received by a groove or channel 312 within the head portion 106 that further secures the screen 118 to the head 106. In other differing embodiments, the tines 108 and second connection point 218 may also be comprised of such a groove or channel 312 that retains the screen 118 in a position above, below, or inside any portion of the tines 108.

Figure 3:
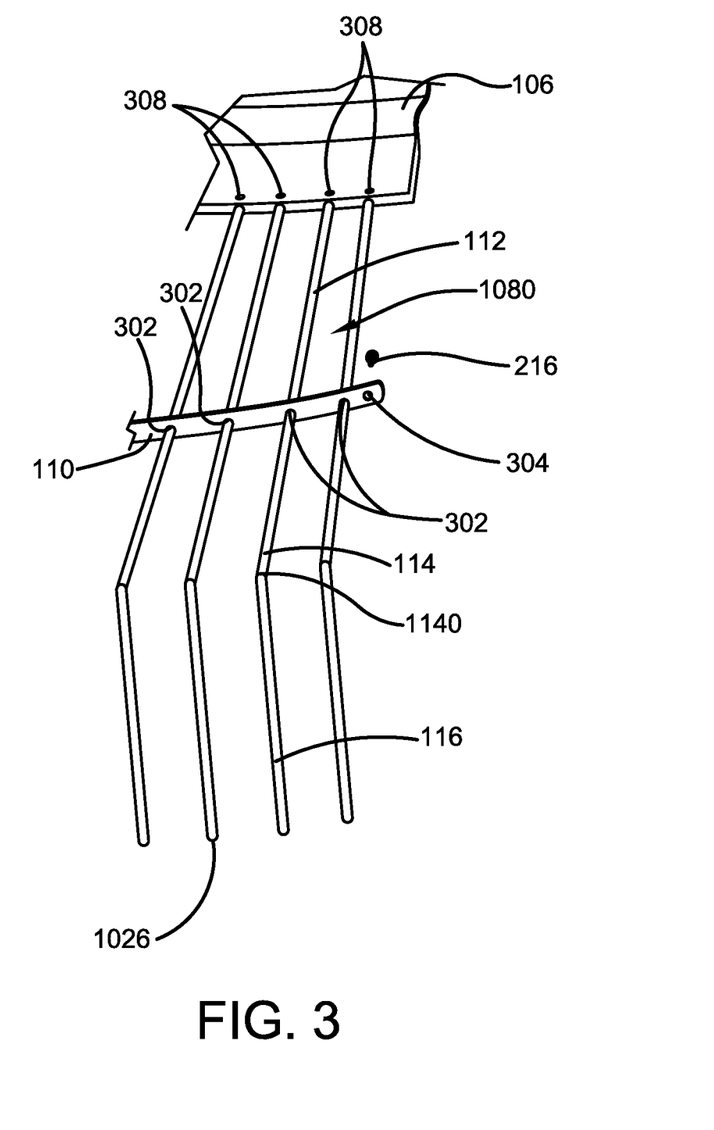
FIG. 3 illustrates a close-up view of a portion of the curved brace of one potential embodiment of a water-cleaning tool of the present invention in accordance with the disclosed architecture.

FIG. 3 illustrates a close-up view of a portion of the curved brace 110 of one potential embodiment of a water-cleaning tool 100 of the present invention in accordance with the disclosed architecture. The curved brace 110 is preferably curved in a semi-circular shape and extends laterally across the elongated plurality of tines 108. The plurality of tines 108 passes through the curved brace 110, which provides strength and support to the tines 108. The curved brace 110 comprises a plurality of continuous openings 302 which allow the tines to pass through the curved brace 110. Each elongated tine 108 extends from the head portion 106 of the tool 100 and passes through a corresponding continuous opening 302 of the curved brace 110. For example, a tine 1080 passes through the corresponding opening 302 to form a longitudinal tine length 112 from a fixed installation point 308 on the head portion 106 to the opening 302 on the curved brace 110. Further, a second longitudinal tine length 114 is formed from the opening 302 on the curved brace 110 to the neck 1140 of the tine 1080. A distal tine portion 116 is then formed from the neck 1140, downwardly extending to the sharp pointed tip 1026. In an alternative embodiment, the curved brace 110 may not have any continuous openings 302 and the elongated tines 108 are welded on the curved brace 110, or secured in any other suitable means as is known in the art.

The curved brace 110 comprises openings at the opposing ends for attaching a filter screen attachment 118 to the tool 100. As shown, other continuous openings 304 allow a mechanical fastener such as a pin or screw to be inserted into the opening 304, thereby allowing the filter screen attachment 118 to fasten to the curved brace 110. Another continuous opening 304 may be positioned at the other end of the curved brace 110 further securing the filter screen attachment 118 to the curved brace 110 in a differing embodiment. Accordingly, using screws or pins to removably secure the filter sheet attachment 118 to the tool 100 allows the filter sheet attachment 118 to be easily removed and replaced when the filter sheet attachment 118 is damaged.

Figure 4:
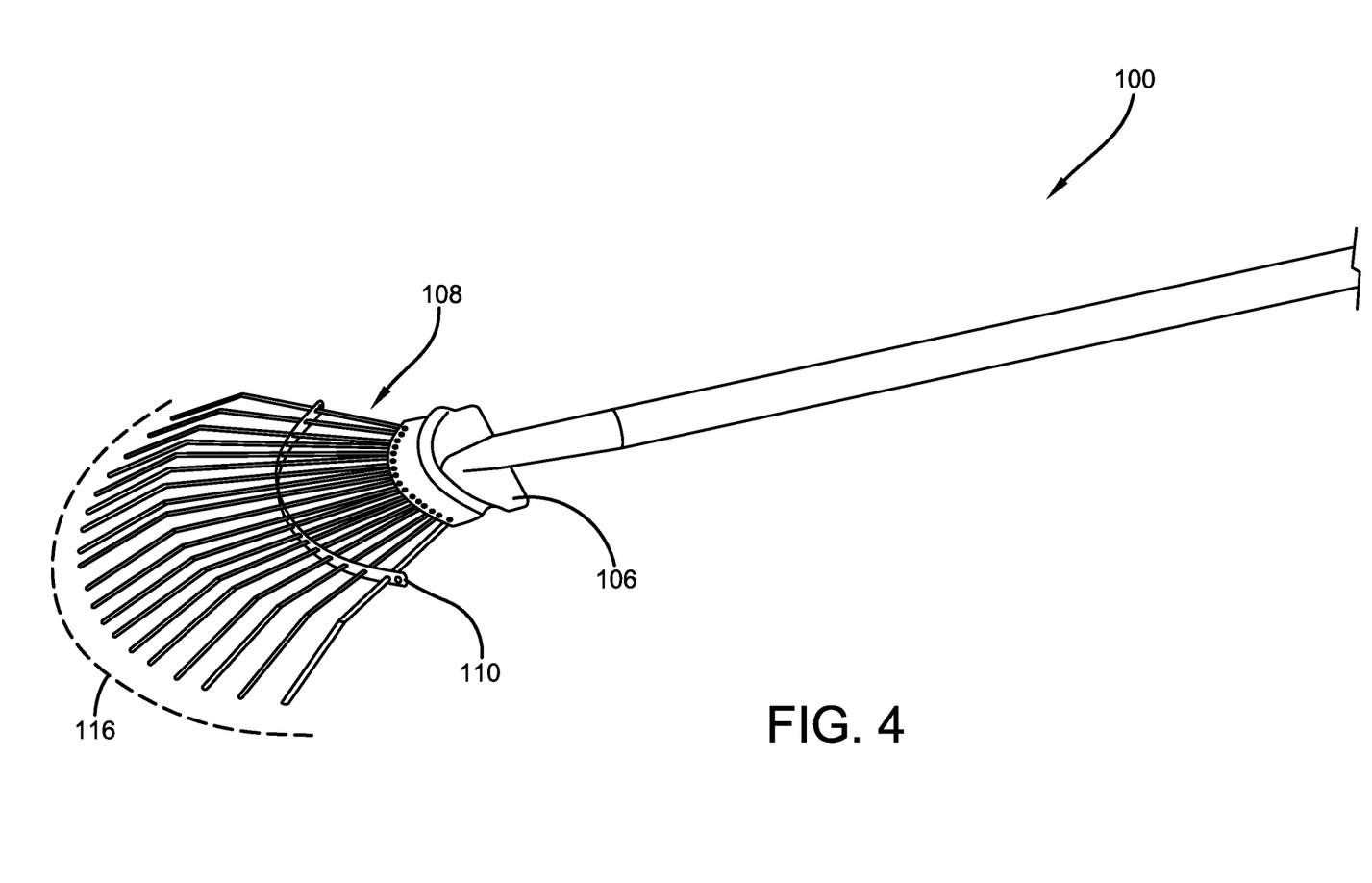
FIG. 4 illustrates a top perspective view showing the plurality of tines of one potential embodiment of a water-cleaning tool of the present invention in accordance with the disclosed architecture.

FIG. 4 illustrates a top perspective view showing the plurality of tines 108 of one potential embodiment of a water-cleaning tool 100 of the present invention in accordance with the disclosed architecture. The plurality of tines 108 are oriented in a non-parallel manner in the tool 100 with the tines 108 crowded near the head portion 106 and then spaced apart near the distal tine portion 116. The non-parallel orientation allows the total width of the distal part of the tines 108 to be larger than that of a conventional rake's tines, which allows a larger area to be covered by the tool 100. As stated supra, spacing between the individual tines increases from the head portion 106 to the distal tine portion 116.

The tines 108 have thin, sharp tips 1026 and are positioned in a tapered orientation towards the head portion 106 of the tool 100. The width of the tines 108 at the distal end 116 is typically in the range of approximately 20"-30". The unique design of the tines 108 makes it easy for a user to collect underwater weeds as well as floating weeds, algae, seaweed and debris using the detachable filter screen attachment 118. The tines 108 are supported by a curved brace 110 which allows heavy weeds to be easily collected by a user.

It should be noted that the tool 100 can be provided with any suitable quantity of tines 108. The illustrated tines 108 are provided with a laterally extending fixed brace 110 along the length of the tines 108. It is noted that the fixed brace 110 is used for also fastening the detachably secured filter screen attachment 118. The filter screen attachment 118 is positioned below the distal portion 116 of the tines 108, thereby allowing the filter screen attachment 118 to easily collect debris. Further, the head portion 106 can be secured to the handle 102 such that it pivotally swings back and forth, or the head portion 106 may be locked in a fixed position with the handle 102, depending on the fastener used to secure the head portion 106 to the handle 102. As such, the tool 100 is ideal for removing floating weeds, leaves, twigs and debris from shorelines. The tool 100 also removes trash debris and free-floating weeds like water hyacinth, bladderwort, salvinia, water lettuce and others. The tool 100 also clears away debris from a lake or pond bed.

FIG. 5 illustrates a top perspective view showing a name plate 502 on the head portion 106 of one potential embodiment of a water cleaning tool 100 of the present invention in accordance with the disclosed architecture. The tool 100 can have a name plate 502 positioned on the head portion 106. The name plate 502 can further be engraved or embossed, etc., and is used for marketing and branding purposes. The name plate 502 can be in any color such as golden or green, or any other suitable color as is known in the art.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "water cleaning tool" and "tool" are interchangeable and refer to the water cleaning tool 100 of the present invention.

Notwithstanding the forgoing, the tool 100 of the present invention can be of any suitable size and configuration as is known in the art without affecting the overall concept of the invention, provided that it accomplishes the above-stated objectives. One of ordinary skill in the art will appreciate that the size, configuration, and material of the tool 100 as shown in FIGS. 1-5 are for illustrative purposes only, and that many other sizes and shapes of the tool 100 are well within the scope of the present disclosure. Although the dimensions of the tool 100 are important design parameters for user convenience, the tool 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A water cleaning tool that acts to remove a plurality of different debris from a body of water, the water cleaning tool comprising:
    an elongated handle comprising a top end and a bottom end;
    a head portion secured to the bottom end;
    a plurality of tines which extend perpendicular from the head portion;
    a curved brace which extends laterally across the plurality of tines to provide support to the plurality of tines; and
    a filter screen attachment removably and pivotally secured to the curved brace and positioned distal to the plurality of tines, wherein the filter screen attachment is a cuboidal-shaped mesh screen; and wherein the filter screen attachment pivots up and down to compensate for an uneven surface.

2. The water cleaning tool of claim 1 further comprising a grip portion positioned at the top end.

3. The water cleaning tool of claim 2, wherein the grip portion is slip-resistant grip.

4. The water cleaning tool of claim 1 further comprising a connector portion secured to the bottom end which secures the head portion.

5. The water cleaning tool of claim 1, wherein the curved brace comprises a plurality of continuous openings which allow the plurality of tines to pass through the curved brace.

6. The water cleaning tool of claim 5, wherein each of the plurality of tines comprise a longitudinal tine length measured from a fixed installation point on the head portion to a continuous opening on the curved brace.

7. The water cleaning tool of claim 6, wherein a second longitudinal tine length is measured from the continuous opening of the curved brace to a neck of the tine.

8. The water cleaning tool of claim 7, wherein a distal tine portion is measured from the neck of the tine to a sharp pointed tip of the tine.

9. The water cleaning tool of claim 1, wherein the curved brace does not comprise continuous openings and the plurality of tines are welded on the curved brace.

10. The water cleaning tool of claim 1, wherein the plurality of tines are laterally spaced apart in a tapered orientation.

11. The water cleaning tool of claim 10, wherein the plurality of tines are spaced close together near the head portion.

12. The water cleaning tool of claim 11, wherein the plurality of tines are spaced far apart near a distal end of the tines.

13. The water cleaning tool of claim 1, wherein the filter screen attachment is removably secured to the curved brace via a pair of connecting arms.

14. The water cleaning tool of claim 13, wherein the pair of connecting arms are fixed to a top edge of the filter screen attachment and to opposing ends of the curved brace.

15. A water cleaning tool that acts to remove leaves and other debris from a body of water, the water cleaning tool comprising:
   an elongated handle comprising a top end and a bottom end;
   a grip portion positioned at the top end;
   a head portion secured to the bottom end;
   a plurality of tines laterally spaced apart in a tapered orientation which extend perpendicular from the head portion;
   a curved brace which extends laterally across the plurality of tines to provide strength and support to the plurality of tines; and
   a mesh filter screen extending from a channel in the head portion across the plurality of tines, wherein each of the plurality of tines comprise a longitudinal tine length measured from a fixed installation point on the head portion to the curved brace, a second longitudinal tine length is measured from the curved brace to a neck of the tine, and a distal tine portion is measured from the neck of the tine to a sharp pointed tip of the tine.

16. The water cleaning tool of claim 15, wherein the mesh filter screen is positioned above the plurality of tines.

17. The water cleaning tool of claim 15, wherein the mesh filter screen is positioned below the plurality of tines.

18. The water cleaning tool of claim 15, wherein the plurality of tines are spaced close together near the head portion and are spaced far apart near a distal end.

19. A tool that acts to remove leaves and other debris from a body of water, the tool comprising:
   an elongated handle comprising a top end and a bottom end;
   a grip portion positioned at the top end;
   a head portion secured to the bottom end;
   a plurality of tines laterally spaced apart in a tapered orientation which extend perpendicular from the head portion, wherein each of the plurality of tines comprise a longitudinal tine length measured from a fixed installation point on the head portion to the curved brace, a second longitudinal tine length measured from the curved brace to a neck of the tine, and a distal tine portion measured from the neck of the tine to a sharp pointed tip of the tine;
   a curved brace which extends laterally across the plurality of tines to provide strength and support to the plurality of tines;
   a cuboidal-shaped mesh filter screen positioned distal to the plurality of tines which skims water to remove debris, wherein a screen attachment is removably and pivotally secured to the curved brace via a pair of connecting arms fixed to a top edge of the filter screen attachment and to opposing ends of the curved brace; and
   a name plate positioned on the head portion.

* * * * *